United States Patent [19]

Washburn et al.

[11] 4,373,422

[45] Feb. 15, 1983

[54] RECIPROCATING FEED SYSTEM

[75] Inventors: William J. Washburn, Capistrano Beach; Hugh B. Thompson, Santa Ana; Clifford E. La Fever, Mission Viejo, all of Calif.

[73] Assignee: Ford Motor Company, Dearborn, Mich.

[21] Appl. No.: 176,222

[22] Filed: Aug. 7, 1980

Related U.S. Application Data

[63] Continuation of Ser. No. 947,283, Sep. 29, 1978, abandoned.

[51] Int. Cl.³ .............................................. F41D 10/04
[52] U.S. Cl. .................................... 89/33 CA; 89/1 L
[58] Field of Search .................... 42/15, 39.5; 89/1 L, 89/11, 33 R, 33 MC, 33 B, 33 BA, 33 BC, 33 C, 33 CA, 45

[56] References Cited

U.S. PATENT DOCUMENTS

| 216,266 | 6/1879 | Gardner | 89/11 |
|---|---|---|---|
| 282,551 | 8/1883 | McClean | 89/1 L |
| 2,410,848 | 11/1946 | Waltke | 89/33 C |
| 2,834,256 | 5/1958 | Wertman | 89/45 |
| 2,876,680 | 3/1959 | Meyer et al. | 89/156 |
| 2,889,749 | 6/1959 | Janson | 89/33 MC |
| 2,976,770 | 11/1956 | Fletcher | 89/126 |
| 2,977,856 | 4/1961 | Fletcher | 89/33 MC |
| 3,598,016 | 8/1971 | Chiabrandy | 89/47 |
| 3,618,452 | 11/1971 | Smith et al. | 89/1.804 |
| 3,667,147 | 6/1972 | Goldin et al. | 42/15 |
| 3,834,272 | 9/1974 | Patenaude et al. | 89/12 |
| 4,244,270 | 1/1981 | Tassie | 89/33 CA |

OTHER PUBLICATIONS

Webster's Third New International Dictionary, 1965, p. 1895.
The Random House Dictionary of the English Language.

Primary Examiner—Stephen C. Bentley
Attorney, Agent, or Firm—Steven L. Permut; Clifford L. Sadler

[57] ABSTRACT

A two-barreled machine gun has two fixed firing chambers, a conveyor, and a feed system mounted within a housing. The feed system transfers ammunition from the conveyor to the firing chamber. The feed system includes a sprocket barrel pivotably mounted about its central longitudinal axis. The sprocket barrel has two receptacle slots and two discharge slots circumferentially spaced thereabout. The sprocket barrel is rotatable between a first and second position. The receptacle slots each have a first position aligned with the conveyor to receive a round of ammunition and a second position aligned with a respective firing chamber. One receptacle slot is in its first position when the other is in its second position. The discharge slots also have a first position aligned with the firing chambers and a second position aligned with an outlet in the housing. One discharge slot is in its first position when the other is in its second position. An ejector cam is also rotatably mounted along an axis aligned with the axis of rotation of the sprocket. The ejector cam is fitted within a central hollow of the sprocket barrel. A drive gear connected to the sprocket barrel oscillates the sprocket barrel between its first and second positions and a second drive gear oscillates the ejector cam so that it laterally passes through the first and second discharge slots when in their respective second positions. The ejector cam ejects any cartridges from the discharge slot as it passes therethrough.

8 Claims, 13 Drawing Figures

RECIPROCATING FEED SYSTEM

This is a continuation of application Ser. No. 947,283, filed Sept. 29, 1978, abandoned.

BACKGROUND OF THE INVENTION

1. Field of the Invention

This invention relates to a feed system, particularly for an automatic machine gun.

2. Description of the Prior Art

Automatic machine guns require rapid feeding of ammunition into the firing chambers. One of the more common type feeding devices includes a rotor placed behind the firing chambers. The rotor draws in a belt of ammunition as it rotates. Often the rotor rotates in an intermittent fashion such that during the stop mode a bolt lug will ram a round of ammunition into one firing chamber and another bolt lug will eject an empty or misfired cartridge from a second chamber. Such devices are disclosed in U.S. Pat. No. 3,834,272 issued to Patenaude et al on Sept. 10, 1974; U.S. Pat. No. 2,972,286 to Marquardt on Feb. 21, 1961; U.S. Pat. No. 2,889,749 to Janson on June 9, 1959; U.S. Pat. No. 3,760,683 to Seemann on Sept. 25, 1973, U.S. Pat. No. 3,733,960 to Ashley et al, on May 22, 1973; U.S. Pat. No. 3,722,356 to Tassie et al on Mar. 27, 1973; U.S. Pat. No. 3,868,884 to Rose et al on Mar. 4, 1975 and U.S. Pat. No. 3,741,069 to Stewart et al on June 26, 1973.

Some rotors have been devised to receive ammunition from a magazine one at a time while rotating in a single direction. Two such devices are disclosed in U.S. Pat. No. 3,618,452 issued to Smith et al on Nov. 9, 1971 and U.S. Pat. No. 2,976,770 issued to Fletcher on Mar. 28, 1961.

U.S. Pat. No. 3,667,147 issued to Goldin et al on June 6, 1972 discloses a rifle with a reciprocially moving breech block which receives both live and spent ammunition.

U.S. Pat. No. 2,977,856 issued to Fletcher on April 14, 1961 discloses a rotating sprocket in a multibarrel rifle which has three bores. Each bore receives both live ammunition and spent cases.

SUMMARY OF THE INVENTION

According to the invention, a feeding means feeds articles to a work station. The feeding means includes a receptacle means mounted in a housing for receiving the articles from a supply source. A drive means also reciprocates the receptacle means between a first position wherein the receptacle means receives articles from the conveyor and a second position wherein the receptacle means is aligned with the work station so that the articles can pass from the receptacle means to the work station.

A discharge means also reciprocates between a first position for receiving used articles after operation thereon by the work station and a second position for passing the used articles to a holding means for holding the used articles. Further, a synchronizing means reciprocates the discharge means between two positions such that the discharge mean is in its first position when the receptacle means is in its respective first position and the discharge means is in its second position when the receptacle means is in its respective second position. An ejector means ejects the used articles from the discharge means when the discharge means is in its second position.

In one embodiment, the receptacle means and discharge means are slots within a frame member. Each slot is sized to receive a single article. The drive means moves the frame member. The synchronizing means includes the slots within the frame member spaced so that when the frame member is moved to a position where a receptacle slot is in its first position, a discharge slot is also in its first position; and when a receptacle slot is in its second position, a discharge slot is in its respective second position.

Preferably the frame member is a sprocket rotatably mounted about its central longitudinal axis. The sprocket has receptacle and discharge slots circumferentially and longitudinally spaced about the perimeter thereof. The drive means oscillates the sprocket pivotably about the central axis between a first and second position.

In one preferred embodiment, ejector means is a cam which oscillates between two positions. The cam passes through a discharge slot as the sprocket moves between its two positions to eject the used articles from the discharge slot. A second drive means oscillates the ejector cam through the discharge slots.

In one embodiment, the drive means for the sprocket includes a driveshaft mounted to the sprocket aligned with the longitudinal central axis of the sprocket. The driveshaft has a pinion gear rigidly mounted thereto. The pinion gear engages a rack. The rack is slideably mounted to the housing. The face cam gear has a groove on one side thereof variably spaced from the central axis of rotation. The rack has one end slideably coupled in the groove of the face gear. As the cam gear rotates, it reciprocates the rack back and forth which in turn oscillates the pinion gear and sprocket connected thereto.

The second drive means, which oscillates the ejector cam, includes a driveshaft mounted to a second pinion gear. The driveshaft of the ejector cam is coaxially mounted with the driveshaft mounted to the sprocket. In the same fashion as the first drive means, the second pinion gear is mounted to the ejector driveshaft which engages with a second rack which is driven by the face cam gear for reciprocating movement.

Preferably the sprocket has a two receptacle slots and a two discharge slots therein. The receptacle slots are located in the sprocket such that when the second receptacle slot is in the first position the first receptacle slot is in its second position and vice versa. The discharge slots are similarly located such that when the first discharge slot is in its first position the second discharge slot is in its second position and vice versa.

In one embodiment, the sprocket has a hollow interior for housing the ejector cam and has a profile tooth positioned between the two discharge slots extending radially outward from the axial center of the sprocket. The outer portion of the profile tooth has surfaces inclined toward each other. The surfaces of the profile tooth form one portion of the first and second discharge slots. The radially outer portion of the profiled tooth extends radially farther outward than the outer radial portion of the ejector cam.

In one embodiment, the sprocket and ejector cam are fitted within a bore in the housing. The housing has an inlet passage and outlet passage aligned with the first position of the receptacle slots and second position of the discharge slots respectively.

In one embodiment, the housing has two camming surfaces at the edge of the outlet passage which align with the edges of the discharge slots when in their second positions.

In one embodiment, the housing is mounted to a gun with a barrel mounted in front of the feeding means. The work station is a firing chamber positioned between the barrel and feeding means. The articles are rounds of ammunition and the used articles are empty cartridges or misfired cartridges commonly referred to as duds.

In operation, the sprocket is positioned such that a receptacle slot and discharge slot are in their respective first positions to receive an article from the supply source and used article from the work station respectively. The drive means for the sprocket rotates the sprocket to move the receptacle and discharge slots to their respective second position. The drive means for the ejector moves the ejector cam laterally through a discharge slot which is momentarily stationery in its second position and the ejector cam moves the article from the discharge slot radially outward into the outlet which is aligned with the discharge slots in the second position. At the same time, one receptacle slot is in its second position to deliver an article therein to the work station. Rams slide the article from the receptacle slot to the work station. The drive means for the sprocket then rotates the sprocket moving the emptied receptacle and discharge slots back to their respective first positions. The profiled tooth moves toward the ejector cam wherein the tapered surface of the profiled tooth abuts against the used article and radially moves it outwardly past the outlet. The used articles abut one of the camming surfaces of the outlet slot as it passes through the outlet.

Drive means of the ejector cam then pass the ejector cam to its second position ready to reciprocate back to its first position. The drive means of the sprocket continues to turn the sprocket such that the emptied receptacle slot and discharge slot are returned to their first position to receive another article and used article respectively.

In this fashion, a feeding mechanism which is capable of rapid cyclic movement is manufactured with a minimum amount of parts and can be made lightweight and in a compact volume which would be suitable for a lightweight machine gun.

BRIEF DESCRIPTION OF THE DRAWINGS

Reference now will be made to the following figures in which.

DETAILED DESCRIPTION OF THE PREFERRED EMBODIMENT

Figure 5:
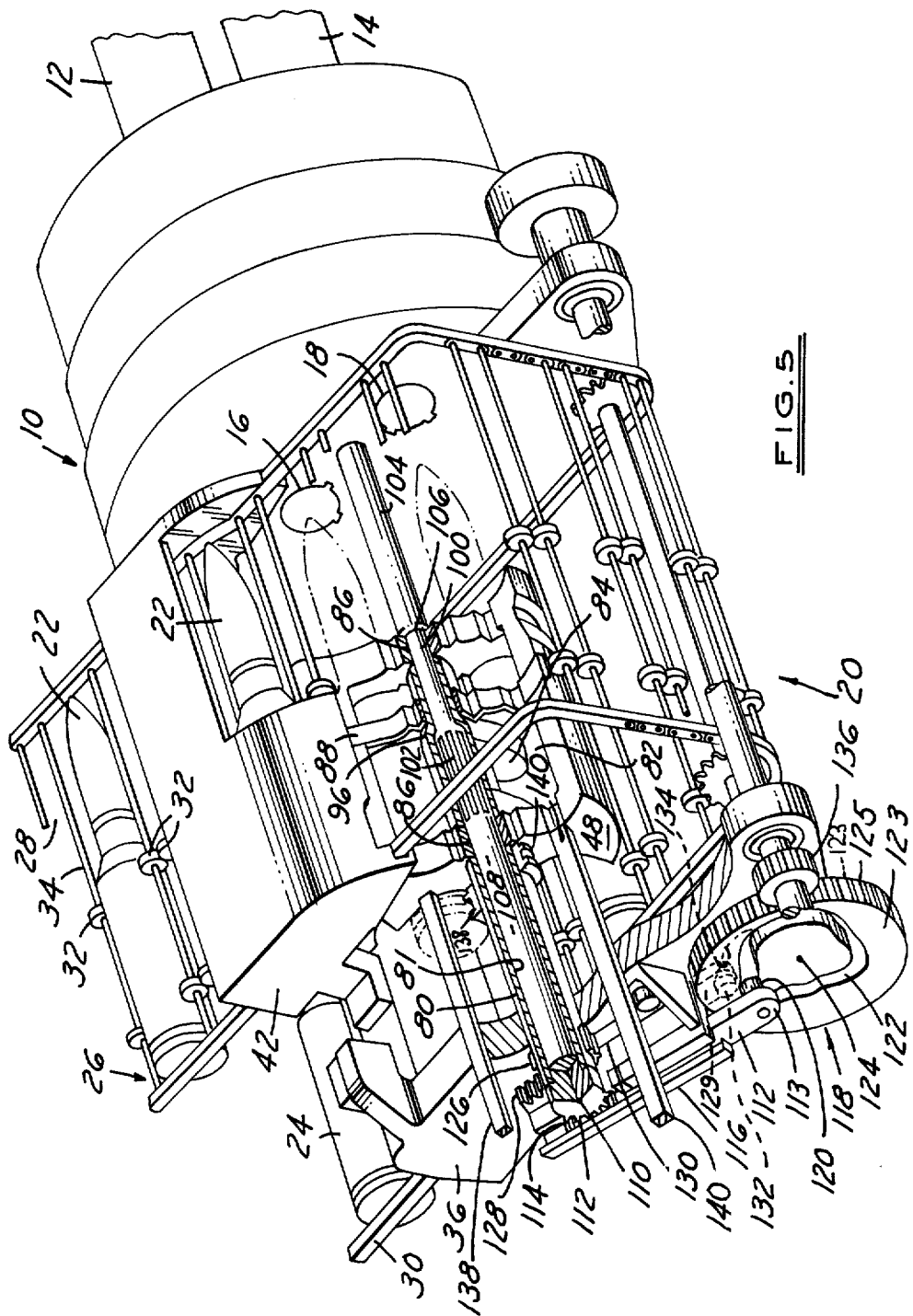
FIG. 5 is a perspective partially cross-sectional view of the embodiment illustrated in FIG. 1.

Referring to FIG. 5, a rapid fire machine gun 10 has two barrels 12 and 14 and two aligned firing chambers 16 and 18. Behind the firing chambers 16 and 18 is a feeding mechanism 20 mounted to housing 36. The feed mechanism 20 feeds ammunition 22 to the firing chambers 16 and 18 and withdraws spent and misfired ammunition 24 from the firing chambers.

A conveyor 26 has a supply portion 28 passing above the firing chambers 16 and 18 with fresh ammunition 22 and a return portion 30 passing below the firing chambers 16 and 18. The conveyor 26 has spacers 32 mounted on rods 34 which move with the conveyor 26 to space and hold the plurality of linkless ammunition rounds 22 and 24.

Figure 1:
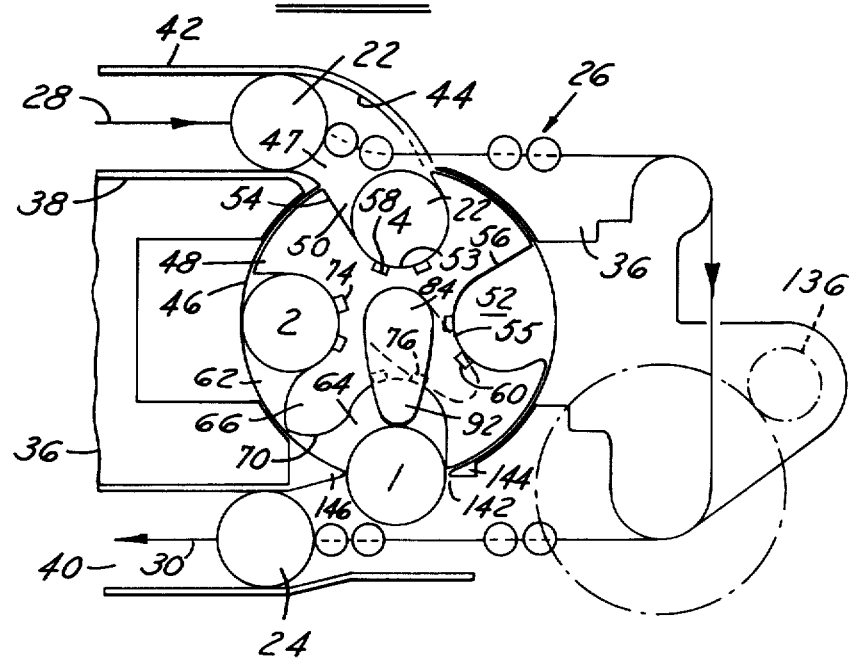
FIG. 1 is a rear elevational schematic view of a preferred embodiment of the invention.

As more clearly shown in FIG. 1, the housing 36 has an upper surface 38 which functions as a platform for the ammunition 22 in conveyor 26. The lower portion of housing 36 has a channel 40 which guides the return portion 30 of the conveyor 26. A fixed fence 42 is mounted to the housing 36. The fixed fence has a convex lower surface 44 which forces the ammunition 22 downward as the conveyor 26 passes thereby. Below the conveyor supply portion 28, a sprocket 48 is mounted within a circular bore 46 of housing 36.

Figure 3:
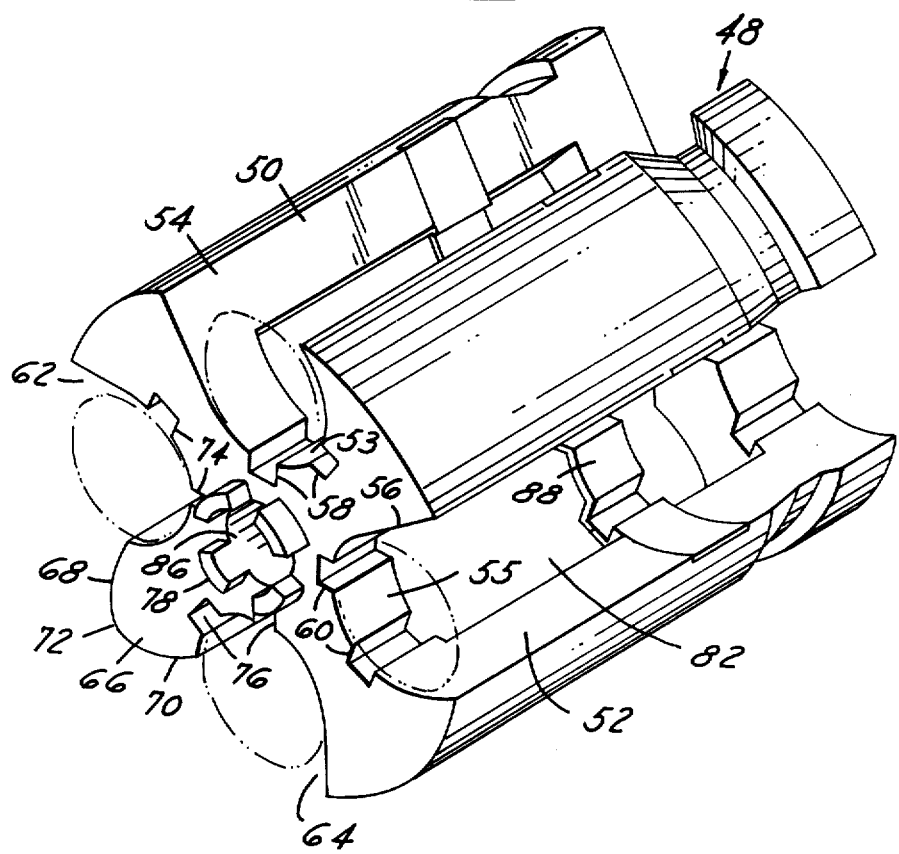
FIG. 3 is a perspective view of the sprocket shown in FIG. 1.

Referring specifically to FIG. 3, the sprocket has two receptacle slots 50 and 52 each sized to receive a round of ammunition. The slots 50 and 52 are circumferentially spaced about the central longitudinal axis of the sprocket and longitudinally aligned therewith. Each slot 50 and 52 has an inclined side surface 54 and 56, respectively, which is inclined with respect to a radius of the sprocket. Inner portions of the slots 50 and 52 have a circular arced portion 53 and 55 with grooves 58 and 60 therein.

Two other discharge slots 62 and 64 are also circumferentially placed about the sprocket in a longitudinal direction. Slots 62, 64, 50 and 52 are each positioned approximately 90° with respect to each other about the sprocket. A profile tooth 66 has outer side surfaces 68 and 70 which taper toward each other to an outer point 72. The side surfaces 68 and 70 form a portion of the respective slots 62 and 64. Discharge slots 62 and 64 also have recessed grooves 74 and 76, respectively. The grooves 58 and 74 receive bolt lugs 138 and grooves 60 and 76 receive bolt lugs 140 as shown in FIG. 5.

The sprocket 48 has an interior hollow section 82 adapted to house an ejector piece 84. Also, a central aperture 86 extends through the two ends of the sprocket. Within the interior hollow 82, a shoulder section 88 conforms to the surface of each slot 50, 52, 62, and 64. The The rear end of the sprocket has a splined section 78 adapted to receive a driveshaft 80 as shown in FIG. 5. Driveshaft 80 has an axially aligned bore 81 extending therethrough.

Figure 4:
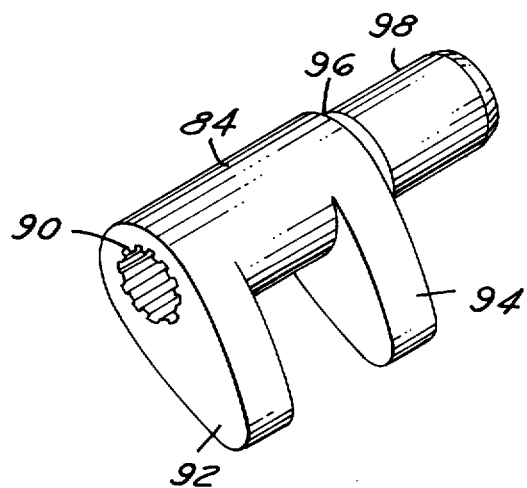
FIG. 4 is a perspective view of the ejector cam shown in FIG. 1.

Referring to FIG. 4, the ejector piece 84 has an internally splined bore 90 extending therethrough. Two aligned cams 92 and 94 are spaced apart and radially extend outwardly from the longitudinal axis of the bore 90. The ejector 84 has a narrower cylindrical extension 98 extending from a shoulder 96.

Referring back to FIG. 5, the ejector cam 84 and sprocket 48 are mounted on a driveshaft 100. The driveshaft 100 has a complementary spline section 102 which meshes with the internally splined bore 90 of ejector cam 84. The driveshaft extends outward from the sprocket 48 through the apertures 86. A forward portion 104 of driveshaft 100 has an outwardly extending shoulder portion 106 which engages a forward end of sprocket 48 to retain the sprocket 48 in a rearward position. The rear portion 108 of driveshaft 100 extends through the bore 81 of driveshaft 80. The driveshaft 100 has its rear end rigidly fastened to a sector gear 110. Shoulder 96 of the ejector cam abuts band 88 to retain the ejector cam in a fixed longitudinal position with respect to socket 48.

The sector gear 110 meshes with a rack section 112 slideably mounted in a groove 114 in a frame 116. The rack 112 has its end 113 mounted to a face cam gear 118 by a follower lug 120 recessed in a grooved pathway 122 in the forward face 123 of face cam bear 118. The face cam gear 118 is rotatably mounted about its central axis by pin 124.

Similarly, driveshaft 80 has its rear end affixed to a sector gear 126 which is meshed with the rack section 128 slidably mounted in groove 130 in rack frame 116. Rack frame 116 is bolted onto housing 36. The free end 129 of rack section 128 is also mounted to the face cam gear 118 by means of a lug 132 recessed in a second grooved pathway 134 on the opposite face 125 of the face cam gear 118.

The face cam gear 118 is driven by a gear assembly 136 which drives both the ejector cam and the sprocket in an oscillating fashion. The gear assembly 136 is also operably connected to bolt lugs 138 and 140 and conveyor 26.

The operation of the feeding mechanism 20 can be described with reference to FIGS. 1 and 2. The gearing mechanism 136 is operably linked to both the conveyor and the sprocket such that the conveyor passes the round of ammunition 22 over slot 47 when receptacle slot 50 is in its first position. As the conveyor 28 continues to move, the ammunition is forced down by the concave surface 44 of fence 42 through inlet 47 and into receptacle slot 50.

The grooved pathway 134 is shaped about the central axis of cam gear 118 to cause the sprocket to oscillate in a 90° arc such that the sprocket moves from position shown in FIG. 2(A) to a position as shown in FIG. 2(E) and back again to the position shown in FIG. 2(I). In addition, at the end of each 90° oscillation, the sprocket comes to a momentary rest.

The grooved pathway 122 is shaped about the central axis of cam gear 118 to oscillate the ejector 84 through a 90° arc centered about the vertically downward direction. In addition, the ejector 84 oscillates in 45° intervals with rests between each interval.

The synchronization of the ejector 84 and sprocket 48 can best be described by reference to FIG. 2. Ammunition round 4 is passed from the conveyor to slot 50 when the sprocket is first positioned and momentarily at rest. The ejector 84 has the cams 92 pointing downwardly extending into discharge slot 64 and abutting spent ammunition round 1 and rejecting it from the slot 64. Rounds 2 and 3 are in the firing chambers. Round 3 is being rammed into the firing chamber 18 by bolt lugs 140 passing through receptacle slot 52 in grooves 58. Bolt lugs 138 extending through discharge slot 62 in grooves 74 are withdrawing spent round 2 from firing chamber 16.

Figure 2:
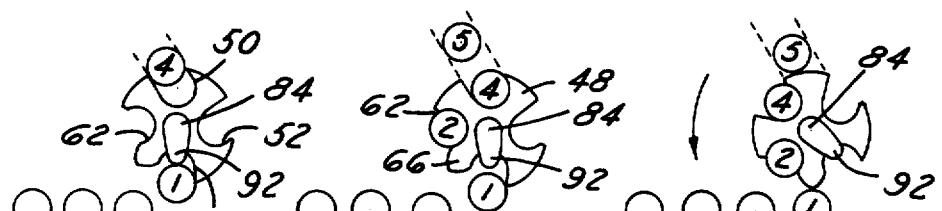
FIGS. 2(A) to 2(I) are a series of schematic rear plan views showing sequential positions of the sprocket and the ejector cam illustrated in FIG. 1.
Figure 2:
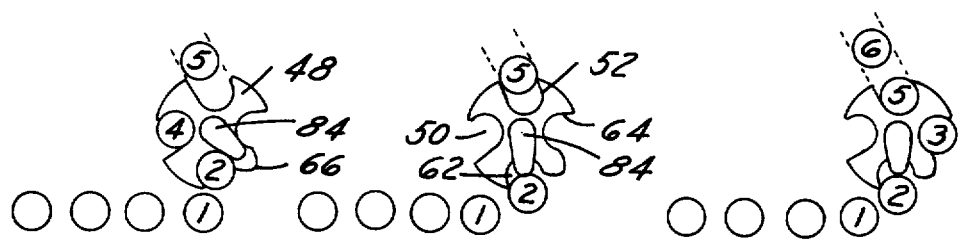
Figure 2:
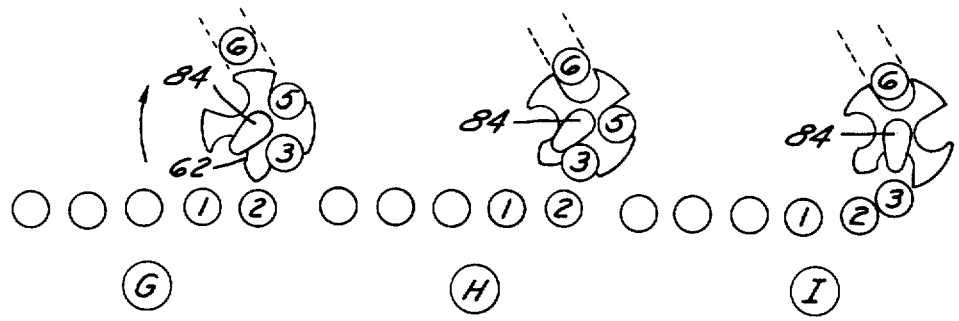

FIGS. 1 and 2 (B) show spent ammunition round 2 being fully positioned within discharge slot 62. Round 3 is in firing chamber 18. Bolt lugs 138 and 140 are then withdrawn from slots 52 and 67. At this point, sprocket 48 begins to rotate in a counter-clockwise direction with ejector 84 still remaining in a rest position. Round 3 is fired. Tooth 66 moves toward alignment with the ejector 84. Since the tooth 66 extends radially farther out than the cams 92, the tapered surface 70 of tooth 66 will abut the half ejected ammunition round 1 and cam it past caming surface 144 through outlet 142 onto the return portion 30 of the conveyor 26.

Once the ammunition round 1 is on the return conveyor, the ejector 84 then oscillates 45° in a counter-clockwise direction to a designated first position and momentarily rests as shown in FIG. 2(C). The sprocket 48 continues to oscillate through its 90° arc to bring slot 62 to a position aligned with outlet 142 and slot 50 aligned with firing chamber 16. At this position, as illustrated in FIG. 2(D), the ejector cams 92 and 94 are aligned with sprocket tooth 66. The sprocket 48 momentarily rests while a new round of ammunition 5 is received from the conveyor to receptacle slot 52, round 4 is rammed by bolts 138 into firing chamber 16, and bolts 140 extend through discharge slot 64 to withdraw the spent ammunition round 3. In addition, ejector cam 84 begins its oscillation in a clockwise direction passing into discharge slot 62 half ejecting spent round 2 therefrom as illustrated in FIG. 2(E). When the ejector cam reaches its vertically downward position, the ejector 84 rests momentarily, as shown in FIG. 2(F). Sprocket 48 then begins its 90° oscillation in a clockwise direction so that sprocket tooth 66 has its tapered camming surface 68 abut fired round 2 to fully eject it through passage 142 onto the return portion 30 of conveyor 26.

The ejector cam 84 then rotates 45° in a clockwise direction to attain a designated second position, as illustrated in FIG. 2(G). Sprocket 48 completes its 90° rotation to bring ammunition round 5 in line with firing chamber 18 and ammunition round 3 in communication with passage 142 for ejection as shown in FIG. 2(H). The cycle is then repeated with ejector cam 92 rotating to half-eject round 3 illustrated in FIG. 2(I).

In this fashion, a multiple number of rounds of ammunition can be rapidly fired into two fixed barrels of a gun.

The oscillation of the sprocket and ejector cam provides for a device with a minimal number of parts and light weight.

Variation and modification are possible within the scope of the foregoing disclosure and drawings without departing from the spirit of the invention, which is defined by the appended claims.

We claim:

1. An article handling system comprising:
   a frame member;
   a work station connected to the frame member;
   a conveyor means connected to the frame member for conveying articles;
   means for feeding said articles from the conveyor means to the work station, the feeding means including:
   a sprocket rotatably mounted about its central axis;
   said sprocket having a receptacle slot at its perimeter for receiving an article from the conveyor means and a discharge slot circumferentially spaced from said receptacle slot;
   a drive means for oscillating the sprocket about its central axis between a first position wherein said receptacle slot in its first position receives the articles from the conveyor means and a second position wherein said receptacle slot in its second position is in communication with the work station and the articles can pass from said receptacle slot to the work station and said discharge slot oscillates between a first position for receiving a used article from the work station and a second position for passing the used article through an outlet in the frame member;

said slots spaced about the sprocket such that the receptacle and discharge slots are in their respective first positions and second positions at simultaneous times;

an ejector cam which oscillates between two positions, the cam abuts the used article held in the discharge slot as the sprocket moves between its two positions to move the used articles radially outward from said discharge slot; and a second drive means for oscillating the ejector cam.

2. A rapid fire gun having a firing chamber positioned behind and in communication with a barrel comprising:

a conveyor means connected to the gun for conveying rounds of ammunition;

means for feeding said rounds from the conveyor means to the firing chamber, the feeding means including:

a sprocket rotatably mounted about its central axis;

said sprocket having a receptacle slot at its perimeter for receiving the rounds from the conveyor means and a discharge slot circumferentially spaced from said receptacle slot;

a drive means for oscillating the sprocket about its central axis between a first position wherein said receptacle slot receives a round of ammunition from the conveyor means and a second position where said receptacle slot in its second position is in communication with the firing chamber and the round can pass from the receptacle slot to the work station and said discharge slot oscillates between a first position for receiving a spent or misfired ammunition cartridge from the firing chamber and a second position for passing said spent or misfired cartridge through an outlet in said gun;

said slots spaced about the sprocket such that the receptacle and discharge slots are in their respective first positions and second positions at simultaneous times;

an ejector cam which oscillates between two positions, the cam abuts the said spent or misfired cartridges held in the discharge slot as the sprocket moves between its two positions to move said spent or misfired cartridge radially outward from said discharge slot; and a second drive means for oscillating the ejector cam.

3. A gun as defined in claim 2 wherein:

the gun includes a second firing chamber positioned behind and in communication with a second barrel;

the sprocket has a second receptacle slot, the first receptacle slot being in its first position when the second receptacle slot is in its respective second position and vice versa;

the sprocket has a second discharge slot, the first discharge slot being in its first position when the second discharge slot is in its respective second position and vice versa.

4. A gun as defined in claim 3, wherein:

two camming surfaces are attached thereto, the camming surfaces are spaced apart to form the outlet therebetween, the outlet is aligned with the discharge slots in their respective second position, a profiled tooth extends radially outward from the axial center of the sprocket between the two discharge slots, the radially outer portion of two side surfaces of the profiled tooth tapers toward each other and extend radially beyond the radial outer edge of the ejector cam, the second drive means passes the ejector cam into the discharge slot in the second position such that the ejector cam abuts the spent cartridge in the slot and moves it radially outward into the outlet, the first drive means rotates the sprocket such that the profiled tooth rotates toward the ejector cam and one of the tapered surfaces of the profile tooth abut against the used cartridge to radially move it outwardly through the outlet, the cartridge also abuts one of the camming surfaces as it passes through the outlet.

5. A gun as defined in claim 4, wherein:

the sprocket has a hollow interior for housing the ejector cam, the ejector cam abuts the spent or misfired cartridge at two axially spaced apart positions to translationally move said cartridge with a minimal amount of pivotable movement from the aligned longitudinal position with respect to the firing chamber and discharge slot.

6. A gun as defined in claims 4 or 5, wherein:

the first and second drive means includes two driveshafts coaxially and rotatably mounted along the central longitudinal axis of the sprocket, the end of each driveshaft has a gear rigidly mounted thereto, each gear engages a rack which in turn is mounted to a face cam gear for reciprocating movement whereby the driveshafts oscillate the sprocket and ejector cam reciprocally through an arc.

7. A gun as defined in claim 6 wherein:

the gun has an inlet passage aligned with the receptacle slot in the first position, a third camming surface is mounted adjacent the conveyor such that ammunition on the conveyor abuts the third camming surface and is directed out of the conveyor through the inlet passage and into one of the receptacle slots when in its respective first position, and a holding means for holding used ammunition includes an empty return portion of the conveyor passing by the outlet after delivering ammunition to the receptacle slots.

8. An article handling system comprising:

a frame member;

a first and second work station connected to the frame member;

a conveyor means connected to the frame member for conveying articles;

means for feeding said articles from said conveyor means to the work stations, the feeding means including:

a sprocket rotatably mounted about its central longitudinal axis;

said sprocket having a first and second receptacle slot at its perimeter for receiving articles from the conveyor means and the first and second discharge slots circumferentially spaced from said receptacle slots;

a drive means for oscillating a sprocket about its central axis between a first position wherein one of said receptacle slots receives articles from the conveyor means and a second position wherein the said one receptacle slot is in communication with the work station and the articles can pass from said one receptacle slot to the work station;

said first discharge slot being in its first position when said sprocket is in its said first position for receiving a used article from the work station and movable to a second position when said sprocket is in its second position for passing the used article from an outlet in the frame member;

said slots being spaced about the sprocket such that the first receptacle and first discharge slots are in their respective first positions simultaneously when said second receptacle slot and second discharge slot are in their respective second positions;

an ejection means for ejecting the used articles from the discharge slots when the respective discharge slots are in their respective second positions.

* * * * *